J. P. Nichols.
Churn.
Nº 98,703.  Patented Jan. 11, 1870.
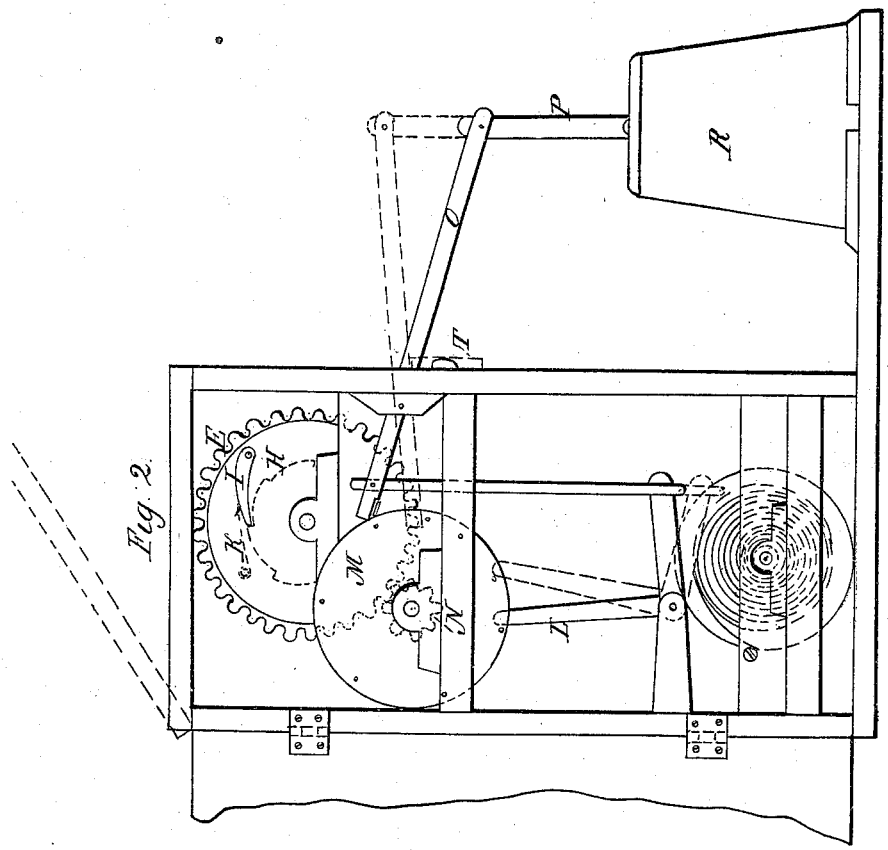
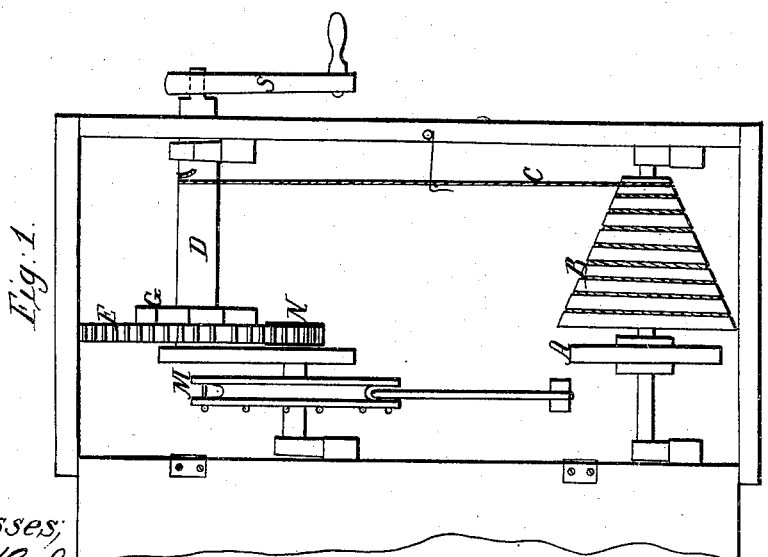
Witnesses:
Wm H Seaman
John McCauly
Inventor:
J. P. Nichols
pr Daniel Breed

United States Patent Office.

JOHN P. NICHOLS, OF NEW RICHMOND, OHIO.

Letters Patent No. 98,703, dated January 11, 1870.

IMPROVEMENT IN CHURNS.

The Schedule referred to in these Letters Patent and making part of the same.

*To all whom it may concern:*

Be it known that I, JOHN P. NICHOLS, of New Richmond, in the county of Clermont, and State of Ohio, have invented a new and useful Improvement in Churns; and I do hereby declare that the following is a full and exact description thereof, reference being had to the accompanying drawings, and to the letters of reference marked thereon.

My invention consists of a new arrangement of churn, operated by a spring.

In the accompanying drawings—

Figure 1 is a front view of the devices for operating the churn, the front side of the box being removed.

Figure 2 is a side view of the same, the side door of the box being opened to show the machinery.

A coiled plate-spring, A, is placed upon the same shaft with the fusee B, and a cord, C, passes from the fusee to another shaft, D, which is provided with a crank, S, for winding up the cord and spring.

Upon this shaft D is a ratchet, H, provided with a pawl, I, and spring K, for locking the ratchet-wheel to the gear-wheel E. This gear-wheel connects or gears into the pinion N upon the same shaft that carries the pallet-wheel M.

The elbow-lever L and the lever O both engage with the pallet-wheel M, and thus transmit a reciprocating vertical motion to the dasher P of the churn R.

A button, T, fig. 2, holds the lever O still until it is desired to set the churn in motion.

In order to prevent noise from the pallet-wheel and levers working thereon, pieces of India rubber are put upon the levers L and O, where they come in contact with the pallets or pins $m$ in the pallet-wheel.

The cream being placed in the churn R, and the spring A being wound up by means of the crank S, the button T is turned to let the lever O move when the machine commences running, and requires no further attention, the dasher P being kept in regular motion until the butter comes, and the machine requires to be stopped or runs down.

I do not broadly claim a spring-churn, or a churn worked by clock-gearing, but I believe the above-described construction and arrangement of churn is a new and a useful improvement.

Having thus described my invention,

I claim, as an improvement in spring-churns—

The arrangement and combination of the spring A, fusee B, cord C, shaft D, gear-wheel E, pinion N, pallet-wheel M, elbow-lever L, lever O, and dasher P, all constructed and operated substantially in the manner and for the purposes set forth.

JOHN P. NICHOLS.

Witnesses:
DANIEL BREED,
Z. BREED.